United States Patent [19]

Hashimoto et al.

[11] Patent Number: 5,084,341

[45] Date of Patent: Jan. 28, 1992

[54] MAGNETIC RECORDING MEDIUM COMPRISING A POLYURETHANE RESIN HAVING A THIO, THIOCARBOXY OR DITHIOCARBOXY GROUP; A VINYL CHLORIDE RESIN CONTAINING A POLAR GROUP AND A HYROXY GROUP; AND A POLYISOCYANATE COMPOUND

[75] Inventors: Hiroshi Hashimoto; Tsutomu Okita; Kiyomi Ejiri, all of Kanagawa, Japan

[73] Assignee: Fuji Photo Film Co., Ltd., Kanagawa, Japan

[21] Appl. No.: 421,025

[22] Filed: Oct. 13, 1989

[30] Foreign Application Priority Data

Oct. 14, 1988 [JP] Japan .................. 63-257288

[51] Int. Cl.$^5$ .............................................. G11B 23/00
[52] U.S. Cl. .................. 428/328; 428/425.9; 428/694; 428/900
[58] Field of Search ............ 428/900, 694, 425.9, 428/328; 528/76

[56] References Cited

U.S. PATENT DOCUMENTS

| | | | |
|---|---|---|---|
| 4,225,698 | 9/1980 | Schuster et al. | 528/75 |
| 4,615,949 | 10/1986 | Yoda et al. | 428/425.9 |
| 4,784,914 | 11/1988 | Matsufuji et al. | 428/418 |
| 4,863,793 | 9/1989 | Ogawa et al. | 428/323 |
| 4,898,922 | 2/1990 | Shiraki | 528/60 |

*Primary Examiner*—Merrell C. Cashion, Jr.
*Assistant Examiner*—Stevan A. Resan

*Attorney, Agent, or Firm*—Sughrue, Mion, Zinn, Macpeak & Seas

[57] ABSTRACT

A magnetic recording medium comprising a non-magnetic support having provided thereon a magnetic layer comprising ferromagnetic metal particles dispersed in a binder, wherein said ferromagnetic metal particles have a crystalline size of 250 Å or less, and said binder comprises (i) a polyurethane resin having an S-containing group which is at least one member selected from the group consisting of —SH,

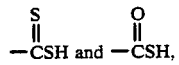

said polyurethane resin being one which has been synthesized by the use of a polyhydric alcohol, as a crosslinking agent, having at least three hydroxyl groups and has a branched and crosslinked structure, (ii) a vinyl chloride resin containing an —OH group and a polar group which is at least one member selected from the group consisting of —SO$_3$M, —SO$_4$M, —OPO(OM)$_2$, —PO(OM)$_2$, —COOM, —NR$_2$ and —NR$_3^\oplus$ (wherein M represents a hydrogen atom or an alkali metal, and R represents an alkyl group having up to 4 carbon atoms), and (iii) a polyisocyanate compound.

14 Claims, No Drawings

MAGNETIC RECORDING MEDIUM COMPRISING A POLYURETHANE RESIN HAVING A THIO, THIOCARBOXY OR DITHIOCARBOXY GROUP; A VINYL CHLORIDE RESIN CONTAINING A POLAR GROUP AND A HYROXY GROUP; AND A POLYISOCYANATE COMPOUND

FIELD OF THE INVENTION

This invention relates to a magnetic recording medium having excellent electromagnetic characteristics and running durability.

BACKGROUND OF THE INVENTION

Magnetic fine particles such as $\gamma$-$Fe_2O_3$, $Fe_3O_4$ and fine particles thereof containing cobalt ions adsorbed thereon or doped thereinto have so far been used as magnetic particles for magnetic recording media. With the recent demand for high-performance video tapes and audio tapes which can record signals at a high density and reproduce short-wave recorded signals at high outputs, ferromagnetic metal fine particles of Fe or Fe-Co or ferromagnetic metal fine particles comprising Fe, Co, Ni, etc. have come into use for such tapes. However, these ferromagnetic metal fine particles tend to agglomerate since they have small crystallite sizes and, in addition, show very large magnetic moments. Because of such agglomeration tendency, it is extremely difficult to uniformly disperse these ferromagnetic metal fine particles into a binder.

For the purpose of overcoming the above problem by improving the affinity of a binder for magnetic particles, there has been proposed, for example, a binder having in its molecular structure a carboxyl group or a sulfonate group (JP-A-57-92422). (The term "JP-A" as used herein means an "unexamined published Japanese patent application".) However, since this binder is still insufficient in the ability to disperse ferromagnetic metal fine particles, not only the magnetic layer using this binder has poor surface properties and is insufficient in residual magnetic flux density and squareness ratio, but also the durability of the magnetic layer is so poor that a dust is apt to be generated therefrom.

JP-A-59-40320 proposes a magnetic recording medium which is excellent in the dispersibility of magnetic particles and the durability and surface gloss of the magnetic layer. This recording medium employs a combination of a vinyl chloride-type binder, which has a hydrophilic group introduced therein and is excellent in the ability to disperse magnetic particles, with a polyurethane-type binder. There is a description in this JP-A to the effect that the polyurethane-type binder in which a hydrophilic polar group has been introduced serves to improve the dispersibility of magnetic particles and the durability of the magnetic layer, while the vinyl chloride-type binder in which a hydrophilic group has been introduced serves to improve the dispersibility of magnetic particles and the surface gloss of the magnetic layer. Although these properties have been improved due to such a combination of binders, this prior art failed to improve the soiling of calender rolls and the clogging of heads. For improving the properties of vinyl chloride copolymers, JP-A-60-235814 proposes a binder obtained by copolymerizing vinyl chloride, a monomer having a strong acid group containing sulfur or phosphorus, and a monomer having an X-OH group (wherein X is an organic residue). According to the specification of this JP-A, the dispersibility of magnetic particles and the surface gloss of the magnetic layer are improved by the presence of a strong acid group, such as a sulfonic acid group, in the binder, and further the durability and running properties of the magnetic layer are improved because the crosslinking reaction of the copolymer with an isocyanate proceeds to a sufficient extent due to the presence of OH groups which are bonded to the main chain through the medium of the organic groups, which is different from the case of polyvinyl alcohol in which OH groups are directly bonded to the main chain. However, even where such a binder is used, the soiling of calender rolls and the clogging of heads cannot be sufficiently diminished.

Furthermore, in attempts to improve the dispersibility of ferromagnetic metal fine particles and to smooth magnetic layer coatings, there have been proposed a method in which a surfactant is incorporated, a method in which ferromagnetic particles are treated with a silicone oil or the like, and a method in which a silane coupling agent or the like reactive to a binder is used. However, sufficient effects cannot be obtained by any of these methods. Thus, there has been a desire for a binder which can more effectively disperse ferromagnetic metal fine particles to be used in magnetic recording medium for high-density recording.

SUMMARY OF THE INVENTION

Accordingly, an object of the present invention is to provide a magnetic recording medium in which ferromagnetic metal fine particles can be present in a sufficiently dispersed state and which not only shows greatly improved properties with respect to calender roll soiling, reproduced output, C/N, head clogging, etc., but also has excellent electromagnetic characteristics and running durability.

The magnetic recording medium according to the present invention comprises a non-magnetic support having provided thereon a magnetic layer comprising ferromagnetic metal fine particles dispersed in a binder, wherein the ferromagnetic metal particles have a crystalline size of 250 Å or less, and the binder comprises (i) a polyurethane resin having an S-containing group which is at least one member selected from the group consisting of —SH,

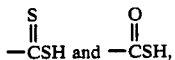

the polyurethane resin being one which has been synthesized by the use of a polyhydric alcohol, as a crosslinking agent, having at least three hydroxyl groups or a polyamine and has a branched and crosslinked structure, (ii) a vinyl chloride resin containing an —OH group and a polar group which is at least one member selected from the group consisting of —$SO_3M$, —$SO_4M$, —$OPO(OM)_2$, —$PO(OM)_2$, —COOM, —$NR_2$ and —$\oplus NR_3$ (wherein M represents a hydrogen atom or an alkali metal, and R represents an alkyl group having up to 4 carbon atoms), and (iii) a polyisocyanate compound.

Preferred embodiments of the magnetic recording medium of this invention are:

1) A magnetic recording medium of the kind described above, wherein said polyurethane resin has 1) $1 \times 10^{-5}$ to $30 \times 10^{-5}$ eq/g (equivalents per gram) a of —SH groups;
2) A magnetic recording medium of the kind described above, wherein polyurethane resin is one which has been synthesized by the use of trimethylol propane, as a crosslinking agent, having a branched structure, the amount of the trimethylolpropane being 0.1 to 1 mmol per gram of the resin, and which has a weight-average molecular weight of from 20,000 to 80,000;
3) A magnetic recording medium of the kind described above, wherein all the ends of each molecule of the polyurethane resin all terminated with an —OH group and the —OH group content in the polyurethane resin have is from $20 \times 10^{-5}$ to $200 \times 10^{-5}$ eq/g;
4) A magnetic recording medium of the kind described above, wherein the polyurethane resin has a glass transition temperature of from $-40°$ C. to $+30°$ C.; and
5) A magnetic recording medium of the kind described above, wherein the vinyl chloride resin has an epoxy group.

DETAILED DESCRIPTION OF THE INVENTION

When the above-described polyurethane resin is used in combination with the above vinyl chloride resin, ferromagnetic metal fine particles show extremely good dispersibility in the binder. Although applicants are not bound by any particular theory of operation of their invention, this result is probably because the polarity of —SH,

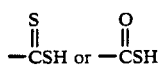

contained in the polyurethane resin employed in this invention is not so strong as compared with that of —SO$_3$M, —PO(OM)$_2$, etc. contained in the vinyl chloride resin, so that the amount of the binder adsorbed on the ferromagnetic metal particles is not decreased by the adsorption competition between the vinyl chloride resin and the polyurethane resin. The branched and crosslinked structure of the polyurethane resin is greatly effective in increasing the shearing force of the binder in the kneading process. That is, the structure brings about a high kneading efficiency, thus further improving the dispersibility of the ferromagnetic metal particles.

From the standpoint of durability, the magnetic recording medium of the invention has the following advantages. Since the amount of the binder adsorbed on the ferromagnetic metal particles is large, not only the mechanical strength of the magnetic layer is high, but also the migration of the unadsorbed binder t the surface of the magnetic layer and the adhesion of the migrated binder to VTR heads or the like can be greatly diminished. Further, since the above-described polyurethane resin has a branched and crosslinked structure, there are a large number of ends in the molecules and, hence, a large number of —OH groups are present. These —OH groups form chemical bonding with the above-described polyisocyanate compound, further improving the durability of the magnetic layer.

The polyurethane resin having a branched and crosslinked structure used in this invention has brought about an unexpected effect, i.e., the soiling of the rolls used in the calendering process is extremely slight. So far, there has been a problem that where binders having low glass transition temperatures (Tg) are used to improve calender-molding properties, part of the binders or magnetic layers peel off and adhere to calender rolls, thereby lowering production efficiency. This problem can be overcome according to the invention. That is, by the use of the polyurethane resin having a branched and crosslinked structure, the soiling of calender rolls is extremely slight even where the Tg of a binder is lowered in order to improve the calender-molding properties of the magnetic layer.

The magnetic recording medium of this invention uses ferromagnetic metal particles as magnetic particles. Examples of the ferromagnetic metal particles are, for example, alloy particles which have a metal content of 75 wt % or more and in which more than 80 wt % of the metal content is at least one kind of ferromagnetic metal or alloy (for example, Fe, Co, Ni, Fe-Co, Fe-Ni, Co-Ni, Co-Ni-Fe) and 20 wt % or less of the metal content is other elements (for example, Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P). The above-described ferromagnetic metals may contain a slight amount of water, hydroxides or oxides. Such ferromagnetic metal particles can be produced by conventional methods, and the ferromagnetic metal particles used in this invention may be ones prepared by a conventional method.

The shape of the ferromagnetic metal particles used in this invention is not particularly limited, but may generally be acicular, particulate, cubical or flat, or the shape of a grain of rice.

The crystalline size of the ferromagnetic metal particles used in this invention is 250 Å or less, with an especially preferred size being 200 Å or less. The term "crystalline size" used herein means a crystalline size as measured by X-ray diffraction.

The polyurethane resin used in the binder according to this invention is characterized as having a S-containing polar group which is at least one member selected from the group consisting of —SH,

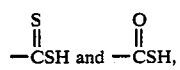

and further characterized as being one which has been synthesized by using, as a crosslinking agent, a polyhydric alcohol having at least three hydroxyl groups or a polyamine and has a branched and crosslinked structure.

The content of the above S-containing polar group is preferably in the range of from $1 \times 10^{-5}$ to $30 \times 10^{-5}$ equivalent per gram of the polyurethane resin, and preferred is an —SH group. If the content is outside this range, the dispersibility of the ferromagnetic metal particles is impaired.

The polyurethane resin preferably has a weight-average molecular weight of from 20,000 to 80,000. If the molecular weight is below this lower limit, the durability of the resulting magnetic layer becomes poor, while a molecular weight exceeding the upper limit results in poor dispersibility of the ferromagnetic metal particles.

The above-described polyurethane resin can be prepared from a polyol having an S-containing group of the above kind, a diisocyanate compound and a crosslinking agent having a branched structure, and if desired and necessary, a chain extender, by a conventional method for preparing polyurethanes.

The above polyol having an S-containing group is, for example, a compound having a structure in which an S-containing group of the above kind has been bonded to the main chain or a side chain of a polyol such as a polyether diol, a polyester diol, a polycarbonate diol or a polycaprolactone diol.

Representative examples of the above polyether diol include polyalkylene glycols such as polyethylene glycol, polypropylene glycol and polytetramethylene glycol.

The above polyester dilyol can be synthesized by, for example, polycondensation of a dihydric alcohol and a dibasic acid, or ring-opening polymerization of lactones such as caprolactone. Representative examples of the dihydric alcohol include glycols such as ethylene glycol, propylene glycol, butanediol, 1,6-hexanediol and cyclohexanedimethanol. Representative examples of the dibasic acid include adipic acid, azelaic acid, sebacic acid, fumaric acid, itaconic acid, phthalic acid, isophthalic acid and terephthalic acid.

The above polycarbonate diol is, for example, a polycarbonate diol which has a molecular weight of 300 to 20,000 and a hydroxyl value of 20 to 300 and which has been synthesized by the condensation or ester interchange of a polyhydric alcohol represented by the formula (I)

$$HO-R^1-OH \qquad (I)$$

wherein $R^1$ represents, for example, 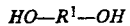$-(CH_2)_n-$ (n=3 to 14),

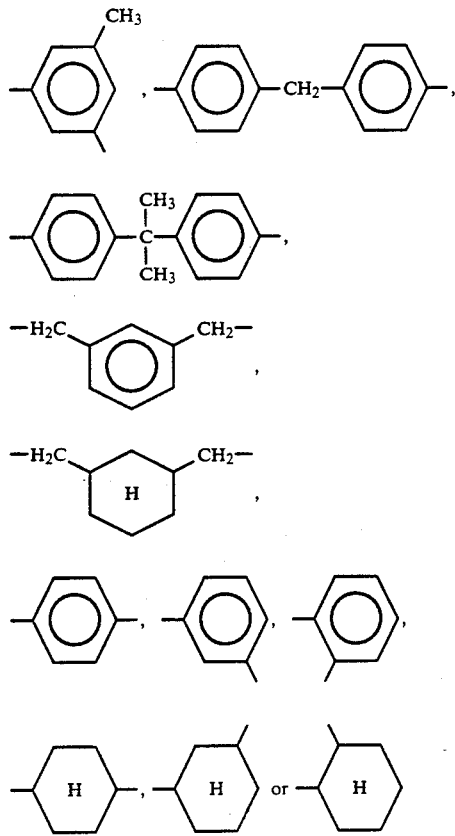

with phosgene, a chloroformic ester, a dialkylcarbonate or a diarylcarbonate; or a polycarbonate dilyester diol which has a molecular weight of 400 to 30,000 and a hydroxyl value of 5 to 300 and which has been synthesized by the condensation of the above polycarbonate diol with a dicarboxylic acid represented by the formula (II)

$$HOOC-R^2-COOH \qquad (II)$$

wherein $R^2$ represents an alkylene group having 3 to 6 carbon atoms, a 1,4-, 1,3- or 1,2-phenylene group, or a 1,4-, 1,3- or 1,2-cyclohexylene group.

The above-described polyol may be used in combination with other polyols, for example, a polyether polyol, a polyester ether polyol and a polyester, with the amount of such other polyols being up to 90 wt % of the above-described polyol.

The diisocyanate to be used for preparing the polyurethane through the reaction with the above polyol is not particularly limited, and can be one which is in conventionally used. Example thereof are hexamethylene diisocyanate, tolylene diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4-diphenylmethane diisocyanate, p-phenylene diisocyanate, m-phenylene diisocyanate, 1,5-naphthylene diisocyanate, 4,4-diphenylmethane diisocyanate, 3,3-dimethylphenylene diisocyanate, and dicyclohexylmethane diisocyanate.

As the above-described crosslinking agent having a branched structure, a polyhydric alcohol having at least three hydroxyl groups is used.

Examples of the polyhydric alcohol having at least three hydroxyl groups include trimethylolpropane, glycerin, hexanetriol, triethanolamine, diglycerol, pentaerythritol, sorbitol, dipentaerythritol, adducts of these polyhydric alcohols with ethylene oxide or propylene oxide, and an adduct of ethylenediamine with propylene oxide.

Preferred of these crosslinking agents having a branched structure are those having three —OH groups per molecule, and trimethylolpropane and glycerin are especially preferred. The amount of the polyhydric alcohol used is from 0.1 to 1 mmol per gram of the polyurethane resin. If the amount exceeds the upper limit, the crosslinking density becomes too high, resulting in poor solubility of the polyurethane resin in solvents. If the amount is below the lower limit, the dispersibility of the ferromagnetic metal particles and the durability of the resulting magnetic layer become poor, and the soiling of calender rolls becomes worse.

The above-described polyhydric alcohol may also function as a chain extender, and other chain extenders which can be used in combination therewith include aliphatic polyamines, alicyclic polyamines and aromatic polyamines.

The polyurethane resin may further contain, in addition to the S-containing group as described hereinbefore, a polar group such as —COOM, —SO₃M, —O-PO₃M or —OM (wherein M represents hydrogen, sodium or potassium).

By the action of the above-described crosslinking agent having a branched structure, the polyurethane resin formed has a branched and crosslinked structure. The ends of all the branched chains of the polyurethane have an -OH group and its content is preferably from $20 \times 10^{-5}$ to $200 \times 10^{-5}$ eq/g. If the content exceeds this upper limit, the solubility of the polyurethane resin in solvents and the dispersibility of the ferromagnetic metal particles become poor, while content below the lower limit impairs the curability of the polyurethane resin, resulting in insufficient durability of the magnetic layer.

The polyurethane resin preferably has a glass transition temperature of from $-40°$ C. to $+30°$ C. If the glass transition temperature is higher than $+30°$ C., calender-molding properties become poor and the electromagnetic characteristics of the resulting recording medium are impaired. If it is below $-40°$ C., the durability of the resulting magnetic layer is impaired.

In the magnetic recording medium of the present invention, the content of the polyurethane resin in the binder is preferably from 10 to 50 wt %, more preferably from 20 to 40 wt %, based on the total weight of the binder.

The vinyl chloride resin used in the binder according to this invention is characterized as having an -OH group and a polar group which is at least one member selected from the group consisting of $-SO_3M$, $-SO_4M$, $-OPO(OM)_2$, $-PO(OM)_2$, $-COOM$, $-NR_2$ and $-\oplus NR_3$.

The vinyl chloride resin employed in this invention is preferably one comprising as a main component a vinyl chloride copolymer, a vinyl chloride-vinyl acetate copolymer, a vinyl chloride-glycidyl (meth)acrylate copolymer, a vinyl chloride-allyl glycidyl ether copolymer, or a vinyl chloride-vinylidene chloride-vinyl acetate copolymer. These vinyl chloride resins are synthesized by, for example, the methods as described in JP-A-58-177524 and JP-A-60-235814.

The content of the above polar group in the vinyl chloride resin is preferably from $1 \times 10^{-5}$ to $30 \times 10^{-5}$ eq/g. Preferred polar groups are $-SO_3M$ and $-OPO(OM)_2$.

The content of -OH group in the vinyl chloride resin is preferably from $10 \times 10^{-5}$ to $200 \times 10^{-5}$ eq/g. Further, -OH groups directly bonded to the main chain, as in the case of vinyl alcohol, are not preferred, and preferred are such -OH groups as those contained in, for example, adducts of (meth)acrylic acid with polyethylene oxide or polypropylene oxide.

If the content of the polar group is either higher than the above upper limit or below the above lower limit, the dispersibility of the ferromagnetic metal particles is impaired. If the -OH group content is below the lower limit, the curability of the vinyl chloride resin becomes poor, resulting in insufficient durability of the magnetic layer. On the other hand, -OH group contents higher than the upper limit impair the solubility of the vinyl chloride resin in solvents.

The vinyl chloride resin preferably has a weight-average molecular weight of from 20,000 to 100,000. If the molecular weight is below this lower limit, the durability of the resulting magnetic layer is impaired, while molecular weights exceeding the upper limit result in poor dispersibility of the ferromagnetic metal particles.

The amount of the vinyl chloride resin contained in the binder is preferably from 30 to 60 parts by weight per 100 parts by weight of the whole binder.

The polyisocyanate compound used in the binder according to the present invention is a compound having at least two isocyanate groups. Examples of the polyisocyanate compound include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; products of the reactions of these isocyanates with polyols; and polyisocyanates produced by the condensation of these isocyanates. The above-mentioned polyisocyanate compounds are commercially available under the trade names of: Coronate L, Coronate HL, Coronate H, Coronate EH, Coronate 2030, Coronate 2031, Coronate 2036, Coronate 3015, Coronate 3041, Coronate 2014, Millionate MR, Millionate MTL, Daltosec 1350, Daltosec 2170 and Daltosec 2280, manufactured by Nippon Polyurethane Industry Co., Ltd., Japan; Takenate D-102, Takenate D-110N, Takenate D-200 and Takenate D-202, manufactured by Takeda Chemical Industries, Ltd., Japan; Sumidule-N75 manufactured by Sumitomo Bayer Co., Ltd., Japan; Desmodule L, Desmodule IL, Desmodule N and Desmodule HL, manufactured by Bayer AG, West Germany; and Burnock-D850 and Burnock-D802, manufactured by Dainippon Ink & Chemicals, Incorporated, Japan. The amount of the polyisocyanate contained in the binder is preferably from 5 to 40 parts by weight per 100 parts by weight of the whole binder including the polyisocyanate.

The non-magnetic support employed in this invention is not particularly limited and can be one which is usually used in this field. Examples of the material for the non-magnetic support include films of various synthetic resins such as polyethylene terephthalate, polypropylene, polycarbonates, polyethylene naphthalate, polyamides, polyamide-imides and polyimides, and metal foils such as an aluminum foil and a stainless-steel foil. The thickness of the non-magnetic support is not particularly limited, but is generally from 2.5 to 100 μm, preferably from 3 to 80 μm.

Besides using the magnetic layer containing the specific binder as described above, the magnetic recording medium of the present invention has the same constitution as that of conventional magnetic recording media. Hence, the conventional techniques can be suitably utilized.

For example, in preparing the magnetic layer of the magnetic recording medium of this invention, the ferromagnetic metal particles and the binder are kneaded together with an organic or inorganic filler and conventional additives such as carbon black, a dispersing agent, an antistatic agent, a lubricating agent and an abrasive material, and also with a solvent, thereby preparing a magnetic coating composition.

The above filler is not particularly limited, and for example, a particulate filler conventionally used having an average particle diameter of 0.01 to 0.8 μm, preferably from 0.06 to 0.4 μm can be used. Examples of the filler include particles of graphite, tungsten disulfide, boron nitride, calcium carbonate, aluminum oxide, iron oxide, titanium dioxide, magnesium oxide, zinc oxide, calcium oxide, lithopone and talc. These fillers may be used alone or in combination.

As the carbon black, furnace black, thermal black, coloring black or acetylene black can be used. It is preferred that the carbon black has an average particle size of from 5 to 1,000 mμ (electron microscope), a specific surface area as measured by nitrogen adsorption method of from 1 to 800 m²/g, a pH of from 4 to 11 (JIS K6221), and an oil absorption as measured with dibutyl phthalate of from 10 to 800 ml/100g (JIS K6221). Regarding the size of carbon black, carbon black of from 5 to 100 nm may be used to reduce the surface electric resistance of a coated film, and carbon black of from 50 to 1,000 nm may be used to adjust the strength of a coated film. Further, fine carbon black of 100 nm or smaller may be used to adjust the surface roughness of a coated film and to smooth the surface for reducing the spacing loss, while coarse carbon black of 50 nm or larger may be used to roughen the surface of a coated film to decrease its friction coefficient. Fine carbon black and coarse carbon black may be used in combination. Carbon black in which part of its surfaces have been graphitized or grafted with organic materials or hydrocarbon compounds graft-polymerizable therewith may be used.

Examples of the dispersing agent are the following conventional dispersing agents: fatty acids having 9 to 32 carbon atoms (for example, caprylic acid, capric acid, lauric acid, myristic acid, palmitic acid, stearic acid, oleic acid, elaidic acid, linolic acid, linolenic acid, stearolic acid), metallic soaps prepared from the above fatty acids and either an alkali metal (for example, lithium, sodium, potassium) or an alkaline earth metal (for example, magnesium, calcium, barium), esters of the above fatty acids, compounds obtained by substituting part or all of the hydrogen atoms in the above esters with fluorine atoms, amides of the above fatty acids, aliphatic amines, higher alcohols, polyalkyleneoxidoalkyl esters of phosphoric acid, alkyl esters of phosphoric acid, alkyl esters of boric acid, sarcosinates, alkyl ether esters, trialkyl polyolefins, oxy quaternary ammonium salts, and lecithin. In the case where a dispersing agent is used, the amount thereof is generally in the range of from 0.05 to 20 parts by weight per 100 parts by weight of the binder used.

Especially preferred dispersing agents are saturated or unsaturated fatty acids having 12 to 32 carbon atoms such as lauric acid, myristic acid, palmitic acid, stearic acid, behenic acid, oleic acid, elaidic acid, linoleic acid, linolenic acid and stearolic acid.

Examples of the antistatic agent are electrically conductive fine particles such as carbon black or carbon black graft polymer particles; natural surface active agents such as saponin, nonionic surface active agents of, for example, the alkylene oxide type, the glycerin type or the glycidol type; cationic surface active agents such as (higher alkyl)amines, quaternary ammonium salts, salts of heterocyclic compounds such as pyridine, and phosphonium or sulfonium compounds; anionic surface active agents containing an acid radical such as a carboxylic acid, sulfonic acid, phosphoric acid, sulfate or phosphate radical; and ampholytic surface active agents such as amino acids, aminosulfonic acids, and esters of sulfuric or phosphoric acid with an amino alcohol. In the case where the above-described electrically conductive fine particles are used as an antistatic agent, the amount thereof is, for example, in the range of from 0.2 to 20 parts by weight per 100 parts by weight of the ferromagnetic metal particles. Where a surface active agent is sued, it is used in an amount of from 0.1 to 10 parts by weight per 100 parts by weight of the ferromagnetic metal particles. Examples of the lubricating agent include conventional lubricating agents such as the above-described fatty acids, amides of these fatty acids, higher alcohols, esters of monobasic fatty acids having 12 to 20 carbon atoms with mono- or polyhydric alcohols having 3 to 20 carbon atoms (e.g., butyl stearate, sorbitan oleate), a mineral oil, a plant or animal oil, a low molecular weight olefin polymer, a low molecular weight α-olefin polymer, a silicone oil, a graphite fine powder, a molybdenum disulfide fine powder, and a Teflon ® fine powder, and further include lubricating agents for plastics. The amount of the lubricating agent added can be freely determined according to a conventional technique.

Representative examples of the abrasive material from the standpoint of the durability of the magnetic layer of the magnetic recording medium are α-alumina, molten alumina, silicon carbide, chromium oxide, cerium oxide, corundum, artificial diamond, α-iron oxide, garnets, emery (main ingredients: corundum and magnetite), silica, silicon nitride, boron nitride, molybdenum carbide, boron carbide, tungsten carbide, titanium carbide, tripoli, diatomaceous earth and dolomite. It is particularly preferred to use abrasive materials having Mohs' hardnesses of 6 or more, which are used alone or in combination of from two to four thereof.

The average particle size of the abrasive material is preferably from 0.005 to 5 μm, more preferably from 0.05 to 2 μm. The amount of the abrasive material added is preferably in the range of from 0.01 to 20 parts by weight per 100 parts by weight of the ferromagnetic metal particles.

The solvent to be used in kneading is not particularly limited, and it can be one which is usually used in preparing conventional magnetic coating compositions.

The method for kneading is also not particularly limited, and the order of the introduction of the components can be suitably determined.

For preparing the magnetic coating composition, a conventional kneading machine can be used. For example, a two-roll mill, a three-roll mill, a ball mill, a pebble mill, a tron mill, a sand grinder, a Szegvari attritor, a high-speed impeller dispersing machine, a high-speed stone mill, a high-speed impact mill, a disper, a kneader, a high-speed mixer, a homogenizer or an ultrasonic dispersing device can be used.

Each of the above-described dispersing agents, antistatic agents and lubricating agents and other additives should not be construed as always having just one function that the name implies. For example, a dispersing agent may act also as a lubricating agent or an antistatic agent. Therefore, effects brought about by or expected from the respective additives are, of course, not limited to the effects implied by the names of these additives. Further, in the case where an additive having plural functions is used, it is preferred that the amount of the additive used is determined taking all these functions into consideration.

In addition to the above-described additives, a detergent dispersing agent, a viscosity index improver, a pour point depressant, an anti-foaming agent and the like can be employed.

The thus-prepared magnetic coating composition is coated on the above-described non-magnetic support. The coating on the non-magnetic support may be done directly or through an intermediate layer such as an adhesive layer.

Methods for the coating on the non-magnetic support are air doctor coating, blade coating, rod coating, extrusion coating, air knife coating, squeeze coating, impregnation coating, reverse roll coating, transfer roll coating, gravure coating, kiss coating, cast coating, spray coating and spin coating. Coating methods other than the above can also be used.

By such a method, the magnetic coating composition is coated such that the resulting magnetic layer has a dry thickness generally in the range of from about 0.5 to 10 μm, preferably from 1.5 to 7.0 μm.

The magnetic layer thus formed on the non-magnetic support is then treated where desired to magnetically orient the ferromagnetic metal particles, and then dried. If desired and necessary, it is further subjected to a surface-smoothing treatment. Thereafter, the thus-treated magnetic recording medium is cut in to a desired shape.

The magnetic recording medium of the invention may have a backing layer which itself is known, on the non-magnetic support's surface opposite to the surface having the magnetic layer.

By the combination of the specific vinyl chloride resin, the polyurethane resin and the polyisocyanate compound, as the binder, the magnetic recording medium of the present invention can be produced without causing the adhesion of grime to the calender rolls, although the recording medium uses, as magnetic particles, ferromagnetic metal particles having extremely small particle sizes and a large magnetic moment. Furthermore, the magnetic recording medium itself has excellent running durability.

The present invention will be described in more detail by reference to the following Examples and Comparative Examples, but the Examples should not be construed to be limiting the scope of the invention. In the Examples and Comparative Examples, all parts are by weight.

EXAMPLES 1 TO 4

100 Parts of ferromagnetic metal particles (particles of an alloy which consisted of 94 wt % Fe, 4 wt % Zn and 2 wt % Ni, and had an Hc (coercive force) of 1,500 Oe and a crystallite size of 250 angstroms) were powdered for 10 minutes with an open kneader. Subsequently, 10 parts of a vinyl chloride copolymer as specified in Table 1 and 60 parts of methyl ethyl ketone were kneaded for 60 minutes together with the ferromagnetic metal particles. 8 parts of a urethane resin (which had been synthesized from a polyol having a polar group, a diisocyanate and a crosslinking agent, all shown in Table 2) and the following ingredients were added thereto:

Abrasive material ($Al_2O_3$, particle size 3 μm): 2 parts
Carbon black (particle size 40 nm): 2 parts
Methyl ethyl ketone/toluene = 1/1: 200 parts The resulting mixture was kneaded by means of a sand mill for 120 minutes to disperse the particulate ingredients. To the resulting dispersion were added the following:

| | |
|---|---|
| Polyisocyanate ("Coronate 3041" manufactured by Nippon Polyurethane Industry Co., Ltd., Japan) | Amount shown in Table 2 |
| Stearic acid | 1 part |
| Butyl stearate | 1 part |
| Methyl ethyl ketone | 50 parts | and the resulting mixture was stirred for 20 minutes, and then filtered through a filter having an average pore diameter of 1 μm, thereby preparing a magnetic coating solution.

The magnetic coating solution thus obtained was coated on a surface of a 10 μm thick polyethylene terephthalate support with a reverse-roll coater at a dry thickness of 3.0 μm.

The non-magnetic support thus coated was subjected to magnetic orientation with a magnet of 3,000 gauss in the state that the magnetic coating was undried. After drying the coating, the coated support was subjected to supercalendering, and then cut into tapes having a width of ⅛ inch to prepare a 8 mm video tape.

COMPARATIVE EXAMPLES 1 TO 5

A video tape for each Comparative Example was prepared in the same manner as in Example 1 except that the composition of the coating fluid for forming a magnetic layer was changed as shown in Tables 1 and 2.

The video tape thus obtained in each of the Examples and Comparative Examples was evaluated for the following properties by the following methods. The results are shown in Table 3.

Soiling of Calender Roll

After the calendering treatment, the roll which had been in contact with the magnetic layer was examined for magnetic layer pieces adhering to the roll surface. The video tapes which resulted in such adhesion are shown by ×, while those resulted in no such adhesion are shown by ○.

Reproduced Output

Using 8 mm video deck FUJIX-8 (manufactured by Fuji Photo Film Co., Ltd., Japan), image signals of 50 IRE (The Institute of Radio Engineers) were recorded by means of a standard recording current. The average of the envelope of the reproduced RF output was measured by means of an oscilloscope, and the reproduced output was calculated using the following equation.

$$\text{Reproduced Output } (dB) = 20 \, \log_{10} V/V_0$$

V: average
$V_0$: standard

Chrominance Video Signal Noise (C/N)

Picture signals of 30 IRE prepared by superimposing chrominance subcarriers of 100% amplitude were recorded by means of a standard recording current. The thus-recorded signals were reproduced, and filtered through a 1 kHz high-pass filter and a 500 Hz low-pass filter. A chrominance signal noise AM component in the reproduced output signals was measured with a noise meter. The same measurement was made on a standard video tape, and the difference between the measured value for the standard video tape and that for the video tape of each of the Examples and Comparative Examples is shown in terms of dB value.

Clogging of Video Head

Video signals were recorded by means of the above-described video deck, and the tape having a length of 90 minutes was run 30 times repeatedly in an ambience of 23° C. and 30% RH. The number of times when the output was dropped by 3 dB or more during the running was counted, and the video tapes which showed no such output drop are shown by ○, those with 1 to 3 times of such output drops are shown by Δ, and those with 4 or more times are shown by ×.

Clogging after 3-day Storage at 60° C.

The video tape samples were stored at 60° C. under 80% RH for 3 days, and then clogging of a head was examined on each tape sample in the same manner as in the above "Clogging of Video Head".

| | Vinyl chloride resin | | |
|---|---|---|---|
| | Polar group (eq/g) | —OH group content (eq/g) | Weight-average molecular weight |
| Example 1 | $-SO_3Na = 8 \times 10^{-5}$ | $30 \times 10^{-5}$ | 50,000 |
| Example 2 | $-OPO(OH)_2 = 10 \times 10^{-5}$ | $50 \times 10^{-5}$ | 45,000 |
| Example 3 | $-COOH = 20 \times 10^{-5}$ epoxy group $= 20 \times 10^{-5}$ | $35 \times 10^{-5}$ | 70,000 |
| Example 4 | $-N(CH_3)_2 = 18 \times 10^{-5}$ | $30 \times 10^{-5}$ | 60,000 |
| Comparative Example 1 | $-SO_3Na = 8 \times 10^{-5}$ | $30 \times 10^{-5}$ | 50,000 |
| Comparative Example 2 | $-SO_3Na = 8 \times 10^{-5}$ | 0 | 55,000 |
| Comparative Example 3 | $-SO_3Na = 8 \times 10^{-5}$ | $30 \times 10^{-5}$ | 50,000 |
| Comparative Example 4 | $-SO_3Na = 8 \times 10^{-5}$ | $30 \times 10^{-5}$ | 70,000 |
| Comparative Example 5 | $-SO_3Na = 8 \times 10^{-5}$ | $30 \times 10^{-5}$ | 50,000 |

| | Polyurethane resin | | | | | | |
|---|---|---|---|---|---|---|---|
| | Polyol | Diiso-cyanate | Crosslinking agent (mmol) | | Polar group (eq/g) | | molecular weight | Amount of polyisocyanate compound (parts by weight) |
| Example 1 | Polybutylene adipate | IPDI*1 | TMP (trimethyl-olpropane) | 0.1 | —SH | $10 \times 10^{-5}$ | 30,000 | 8 |
| Example 2 | Polybutylene adipate | MDI*2 | TMP | 0.5 | —COSH | $30 \times 10^{-5}$ | 32,000 | 8 |
| Example 3 | Polypropylene glycol/caprolactone/phthalic acid(4/4/2 molar ratio) | TDI*3 | TMP | 1.0 | —SH | $20 \times 10^{-5}$ | 50,000 | 8 |
| Example 4 | Neopentyl glycol/caprolactone/phtalic acid | HMDI*4 | TMP | 0.5 | —CSSH | $15 \times 10^{-5}$ | 43,000 | 8 |
| Comparative Example 1 | Polybutylene adipate | IPDI | none | — | —SH | $10 \times 10^{-5}$ | 30,000 | 8 |
| Comparative Example 2 | Polybutylene adipate | IPDI | TMP | 0.1 | —SH | $8 \times 10^{-5}$ | 50,000 | 8 |
| Comparative Example 3 | Polybutylene adipate | IPDI | TMP | 0.1 | —SH | $8 \times 10^{-5}$ | 50,000 | 0 |
| Comparative Example 4 | Neopentyl glycol/caprolactone/phtalic acid (4/4/2 molar ratio) | MDI | none | — | $-SO_3Na$ | $8 \times 10^{-5}$ | 48,000 | 8 |
| Comparative Example 5 | Polybutylene adipate | MDI | none | — | none | — | 80,000 | 4 |

*1 Isophorone diisocyanate
*2 Diphenylmethane diisocyanate
*3 Tolylene diisocyanate
*4 Hexamethylene diisocyanate

TABLE 3

| | Calender roll soiling | Re-produced output (dB) | C/N (dB) | Video head Clogging | Clogging after 60° C., 3-day storage |
|---|---|---|---|---|---|
| Example 1 | ○ | 1.2 | 1.8 | ○ | ○ |
| Example 2 | ○ | 1.0 | 1.5 | ○ | ○ |
| Example 3 | ○ | 1.0 | 1.8 | ○ | ○ |
| Example 4 | ○ | 1.1 | 1.6 | ○ | ○ |
| Comparative Example 1 | X | ±0.0 | ±0.0 | X | X |
| Comparative Example 2 | ○ | 0.2 | 0.1 | Δ | X |
| Comparative Example 3 | ○ | 0.9 | 0.8 | X | X |
| Comparative Example 4 | X | −0.2 | −0.3 | X | X |
| Comparative Example 5 | X | −0.5 | −0.8 | X | X |

The results shown in Table 3 show that all the video tape samples obtained in the Examples are decidedly superior to those obtained in the Comparative Examples in all of calender roll soiling, reproduced output, C/N and head clogging.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having provided thereon a magnetic layer comprising ferromagnetic metal particles dispersed in a binder, wherein said ferromagnetic metal particles have a crystalline size of 250 Å or less, and said binder comprises:
(i) a polyurethane resin having an S-containing group in an amount of from $1 \times 10^{-5}$ to $30 \times 10^{-5}$ equivalent per gram of the polyurethane resin, said S-containing group being at least one member selected from the group consisting of —SH,

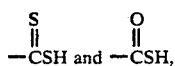

said polyurethane resin having a weight average molecular weight of from 20,000 to 80,000 and a glass transition temperature of from $-40°$ C. to $+30°$ C., and having been synthesized using a polyhydric alcohol having at least three hydroxyl groups as a crosslinking agent in an amount of from 0.1 to 1 mmol per gram of the polyurethane resin to provide a branched and crosslinked structure of the polyurethane resin, (ii) a vinyl chloride resin containing an —OH group in an amount of from $10 \times 10^{-5}$ to $200 \times 10^{-5}$ eq/g and a polar group which is at least one member selected from the group consisting of $-SO_3M$, $-SO_4M$, $-OPO(OM)_2$, $-PO(OM)_2$, $-COOM$, $-NR_2$ and $-N \oplus R_3$ wherein M represents a hydrogen atom or an alkali metal, and R represents an alkyl group having up to 4 carbon atoms, said vinyl chloride resin having a weight average molecular weivght of from 20,000 to 100,000, and (iii) a polyisocyanate compound.

2. The magnetic medium of claim 1, wherein the ferromagnetic metal particles are alloy particles having a metal content of 75 weight % or more and in which more than 80 weight % of the metal content is at least one kind of ferromagnetic metal or alloy.

3. The magnetic recording medium of claim 2, wherein the ferromagnetic metal or alloy is selected from the group consisting of Fe Co, Ni, Fe—Co, Fe—Ni, Co—Ni and Co—Ni—Fe.

4. The magnetic recording medium of claim 1, in which the crystalline size is 200 Å or less.

5. The magnetic recording medium of claim 1, wherein the S-containing group is provided by a polyol used in the preparation of the polyurethane resin.

6. The magnetic recording medium of claim 1, wherein the polyhydric alcohol as a crosslinking agent having at least 3 hydroxyl groups is selected from the group consisting of trimethylolpropane, glycerin, hexanetriol, triethanolamine, diglycerol, pentaerythritol, sorbitol, dipentaerythritol, adducts of these polyhydric alcohols with ethylene oxide or propylene oxide, and an adduct of ethylenediamine with propylene oxide.

7. The magnetic recording medium of claim 6, wherein the polyhydric alcohol having at least 3 hydroxyl groups is trimethylolpropane or glycerin.

8. The magnetic recording medium of claim 1, wherein all of the ends of the branched chains of the polyurethane have an —OH group and the content of —OH group of the polyurethane is $20 \times 10^{-5}$ to $200 \times 10^{-5}$ eq/g.

9. The magnetic recording medium of claim 1, wherein the polyurethane resin is from 10 to 50 weight % of the total weight of the binder.

10. The magnetic recording medium of claim 1, wherein the vinyl chloride resin comprises as a main component a vinyl chloride copolymer, a vinyl chloride-vinyl acetate copolymer, a vinyl chloride-glycidyl (meth)acrylate copolymer, a vinyl chloride-allyl glycidyl ether copolymer, or a vinyl chloride-vinylidene chloride-vinyl acetate copolymer.

11. The magnetic recording medium of claim 1, wherein the amount of the vinyl chloride resin is from 30 to 60 parts by weight per 100 parts by weight of the whole binder.

12. The magnetic recording medium of claim 1, wherein the polyisocyanate compound is contained in the binder in an amount of from 5 to 40 parts by weight per 100 parts by weight of the whole binder.

13. The magnetic recording medium of claim 1, wherein the polyurethane resin has been synthesized by the use of trimethylolpropane as a crosslinking agent, has a branched structure, the amount of the trimethylolpropane being 0.1 to 1 mmol per gram of the polyurethane resin and the polyurethane resin has a weight average molecular weight of from 20,000 to 80,000.

14. The magnetic recording medium of claim 1, wherein the vinyl chloride resin has an epoxy group.

* * * * *